United States Patent
He et al.

(10) Patent No.: US 10,589,504 B2
(45) Date of Patent: Mar. 17, 2020

(54) LAMINATION MANUFACTURING METHOD FOR LARGE-SIZE AND COMPLEX-STRUCTURE METAL COMPONENTS

(71) Applicant: Harbin Institute of Technology, Harbin (CN)

(72) Inventors: Zhubin He, Harbin (CN); Kun Zhang, Harbin (CN); Haihui Zhu, Harbin (CN); Shijian Yuan, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 16/094,626

(22) PCT Filed: Dec. 27, 2016

(86) PCT No.: PCT/CN2016/112235
§ 371 (c)(1),
(2) Date: Oct. 18, 2018

(87) PCT Pub. No.: WO2018/072318
PCT Pub. Date: Apr. 26, 2018

(65) Prior Publication Data
US 2019/0105891 A1     Apr. 11, 2019

(30) Foreign Application Priority Data

Oct. 19, 2016  (CN) .......................... 2016 1 0911437

(51) Int. Cl.
*B32B 3/00*       (2006.01)
*B32B 15/00*      (2006.01)
(Continued)

(52) U.S. Cl.
CPC .......... *B32B 38/0004* (2013.01); *B23P 15/00* (2013.01); *B32B 3/266* (2013.01);
(Continued)

(58) Field of Classification Search
CPC ... B32B 38/00; B32B 38/0004; B32B 38/001; B32B 38/0012; B32B 38/10;
(Continued)

(56) References Cited

U.S. PATENT DOCUMENTS

| | | | | |
|---|---|---|---|---|
| 9,776,363 B2 * | 10/2017 | Ohno | ...................... | B29C 64/20 |
| 2010/0244333 A1 * | 9/2010 | Bedal | ..................... | B33Y 10/00 |
| | | | | 264/497 |

FOREIGN PATENT DOCUMENTS

| CN | 103350321 A | 10/2013 |
|---|---|---|
| CN | 103522022 A | 1/2014 |

(Continued)

*Primary Examiner* — Jacob T Minskey
*Assistant Examiner* — Matthew Hoover
(74) *Attorney, Agent, or Firm* — Lathrop GPM LLP

(57) ABSTRACT

A lamination manufacturing method for large-sized metal components with complicated structures is provided, relating to a part manufacturing method to solve the problem that traditional machining, entire plastic forming and the existing additive manufacturing method are difficult to manufacture large-sized metal components with complicated special-shape structure and high-performance requirement. The manufacturing method includes the steps: step 1. obtaining a three-dimensional digital model of a large-sized metal component with complicated structure, and dividing the model into a plurality of slice layers; step 2. selecting the actually available metal sheet corresponding to the thickness of each slice layer divided in step 1, and machining each metal sheet to obtain a shaped sheet consistent with the model of each slice layer in step 1; step 3. stacking the shaped sheets obtained through machining of step 2 according to the order of the corresponding slice layers in step 1; and step 4. obtaining a required large-sized metal component with complicated structure after all the shaped sheets are connected into a whole. The present invention is used for (Continued)

shaping large-sized components with complicated deep cavity and inner hole structures.

5 Claims, 5 Drawing Sheets

(51) Int. Cl.
    *B32B 37/00*     (2006.01)
    *B32B 38/00*     (2006.01)
    *B32B 37/12*     (2006.01)
    *B32B 38/18*     (2006.01)
    *B32B 3/26*     (2006.01)
    *B32B 15/01*     (2006.01)
    *B23P 15/00*     (2006.01)

(52) U.S. Cl.
    CPC .............. *B32B 15/01* (2013.01); *B32B 37/12* (2013.01); *B32B 38/0012* (2013.01); *B32B 38/1841* (2013.01); *B23P 2700/12* (2013.01)

(58) Field of Classification Search
    CPC ... B32B 38/18; B32B 38/184; B32B 38/1841; B32B 3/00; B32B 3/20; B32B 3/26; B32B 3/266; B32B 15/00; B32B 15/01; B32B 37/00; B32B 37/10; B32B 37/12; B32P 15/00

See application file for complete search history.

(56) References Cited

FOREIGN PATENT DOCUMENTS

| | | |
|---|---|---|
| CN | 103600166 A | 2/2014 |
| CN | 103753132 A | 4/2014 |
| CN | 103909268 A | 7/2014 |
| CN | 104325264 A | 2/2015 |
| CN | 104827155 A | 8/2015 |
| CN | 204852246 U | 12/2015 |
| CN | 105537519 A | 5/2016 |
| CN | 105834423 A | 8/2016 |
| EP | 1461198 A2 | 9/2004 |

* cited by examiner

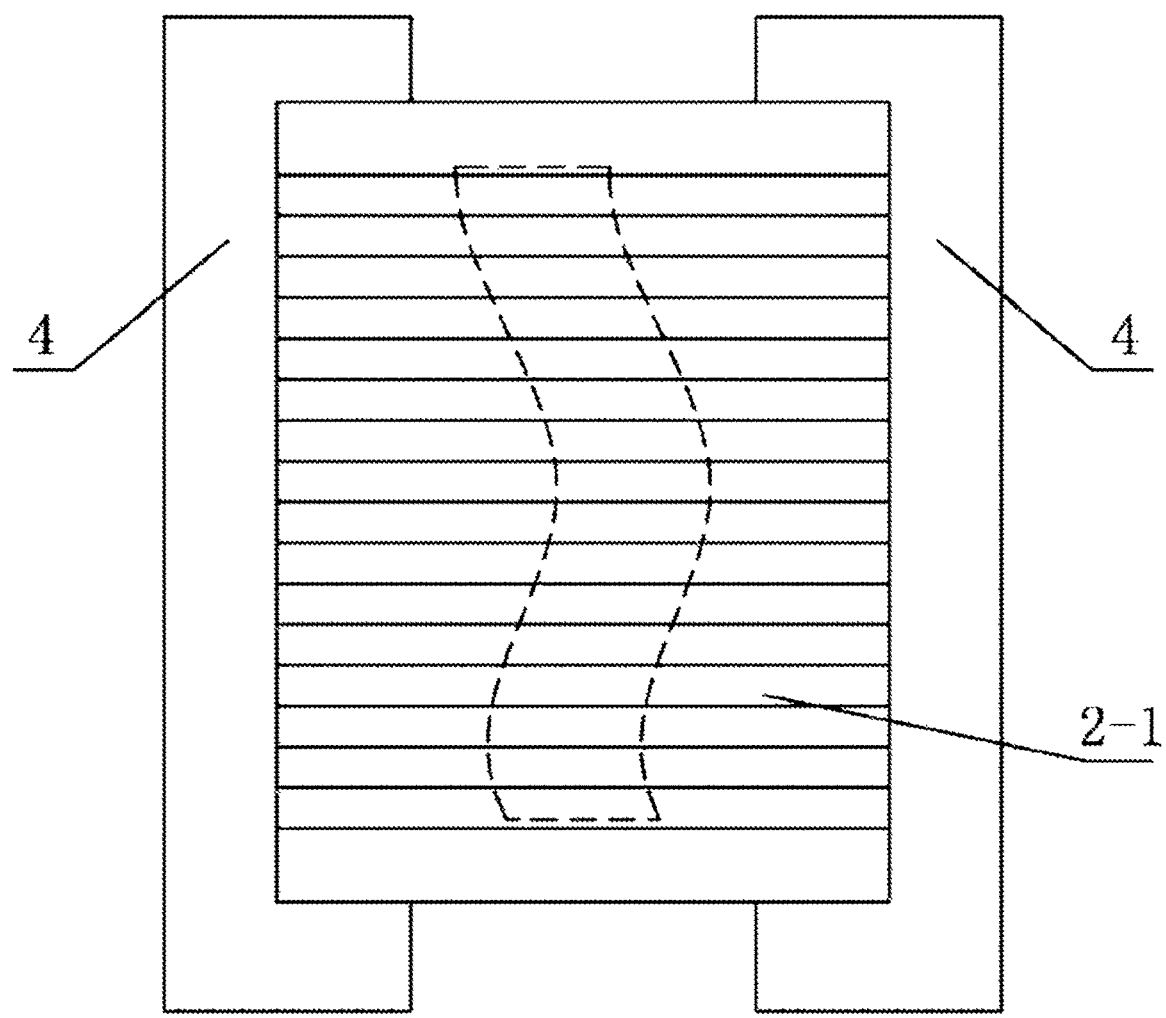
Fig. 2 (as an illustration in Abstract)
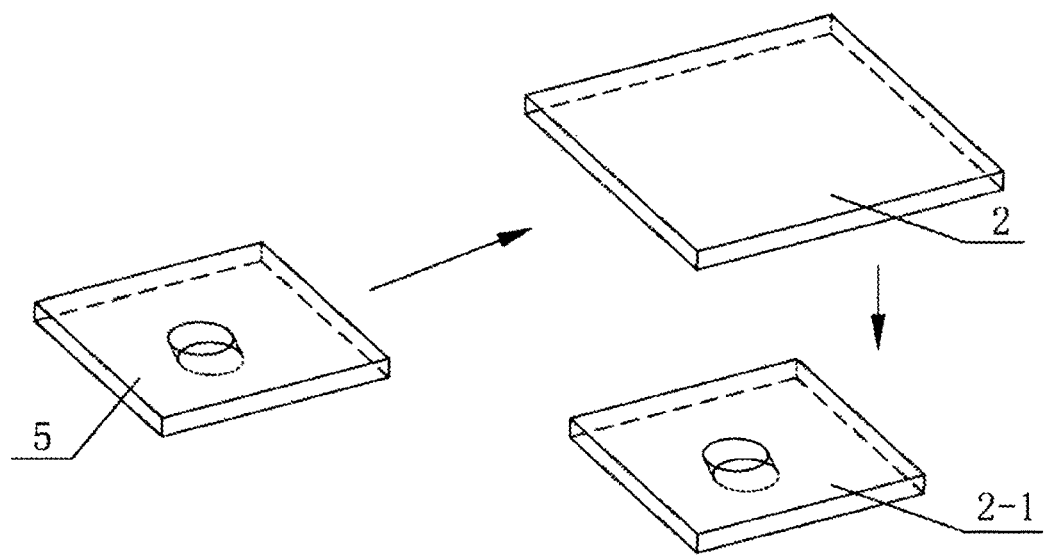
Fig. 3

LAMINATION MANUFACTURING METHOD FOR LARGE-SIZE AND COMPLEX-STRUCTURE METAL COMPONENTS

TECHNICAL FIELD

The present invention relates to a part manufacturing method, and particularly relates to a method for manufacturing large-sized complicated components through metal sheets in a lamination manner.

BACKGROUND

In recent years, with the continuous development and progress of science and technology, the structures and functions of mechanical equipment or devices have become increasingly complicated. Components are required to realize large volume, light weight and integration of structures and functions, which poses higher requirements and new challenges to manufacturing technologies. The manufacture of large-sized (exceeding 1000 mm in a certain direction) metal components with complicated structures, such as load carrying components with complicated inner holes and light components with complicated rib structures, has become the emphasis of the development of modern manufacturing technologies. For the large-sized metal components with complicated structures, large amount of cutting is required by a machining method. When the components have deep cavity and inner hole structures, manufacture cannot be realized by the machining method. When the large-sized complicated components are shaped by integral forming, due to large metal deformation resistance and large local flow resistance, the shaping of the large-sized components may be completed only by large tonnage equipment. Although loads required by shaping can be reduced by local loading or local shaping, due to the complexity of flow law of metal deformation, deep cavity and inner hole structures cannot be directly shaped by this method. In addition, the key factor that limits the integral forming of the large-sized complicated component is the difficulty in preparation of large-sized original stock (often dozens of or even hundreds of tons).

In order to achieve high efficiency and high precision manufacturing of the component with complicated structure, some new manufacturing methods, such as additive manufacturing technologies, have emerged. The traditional additive manufacturing technologies include stereolithography, laminar layering and lamination shaping, fused deposition, etc. The shaped materials are mainly plastic and paper. Because of the disadvantages of low strength, low plasticity and low tenacity, the plastic and the paper often cannot satisfy the use requirement of the actual structural component. In recent years, an additive manufacturing technology (i.e., metal 3D printing technology) for shaping metal materials has been gradually developed and applied. The shaping principle is: electron beams or laser beams are used to partition regions for the substrate material (in accordance with mathematical models of parts) for heating and melting to form small molten pools; metal powder materials are absorbed by the molten pools and then are connected with the substrate; and metal deposits are accumulated layer by layer to obtain parts. The components with complicated structures, such as titanium alloy bulkheads of aircraft engines, etc., can be shaped through the method. However, because the metal materials are continuously heated and cooled during 3D printing, large residual stress exists in the shaped parts, and the mechanical performance of the obtained parts cannot meet the design requirements. At the same time, the production efficiency of 3D printing method is very low, and it often takes months or even longer time to complete the shaping of the large-sized complicated components. In addition, the parts shaped by the method have poor surface quality, and the shaped parts shall be machined, but workpieces with complicated structures with deep cavity and inner hole cannot be cut subsequently.

Recently, on the basis of the traditional laminar layering and lamination method, a new additive manufacturing method of metal components, i.e., ultrasonic additive manufacturing method, has appeared. For example, an auxiliary heating ultrasonic rapid shaping method and device proposed in the application of patent for invention with the publication number of CN103600166A, literature "Study on rapid shaping method based on ultrasonic welding technology" (periodical: machine tool and hydraulic pressure, 2007, Volume 3, Issue 3), literature "Effect of Process Parameters on Bond Formation During Ultrasonic Consolidation of Aluminum Alloy 3003; Journal of Manufacturing systems, Volume 25, Issue 3" and literature "Development of Functionally Graded Materials by Ultrasonic Consolidation; doi: 10.1016/j.cirpj.2010.07.006" have a research on shaping of the three-dimensional solid blocky actual part in a manner of ultrasonic consolidation of foil.

The principle of shaping the three-dimensional solid blocky actual part in the manner of ultrasonic consolidation of foil is: a layer of metal foil (with a general thickness of 0.1-0.2 mm) is connected with a next layer of substrate material through ultrasonic vibration; after connection, residual parts of the layer of metal foil are cut away in accordance with a mathematical model; then a layer of metal foil is paved on the layer of metal foil and is connected through ultrasonic vibration; and after repeating like this, a required part can be obtained. The shaping method is currently used for shaping small-sized metal parts or micro parts. However, because the metal foil with small thickness is adopted and is connected layer by layer, the production efficiency is very low and the method cannot be used for the manufacture of large-sized components with large thickness or height. At the same time, because the mechanical performance of metal foil is poor and the connection reliability between adjacent layers is poor, the practical use requirements for the large-sized components cannot be satisfied. In addition, large-breadth (length and width) metal foil with uniform mechanical performance and thickness cannot be prepared at present. To solve the problem that traditional machining, integral forming and the existing additive manufacturing method are difficult to obtain large-sized metal components with complicated special-shape structure and high-performance requirement, a new manufacturing method for large-sized metal components with complicated structures shall be established.

SUMMARY

The present application proposes a lamination manufacturing method for large-sized metal components with complicated structures, so as to solve the problem that traditional machining, integral forming and the existing additive manufacturing method are difficult to manufacture large-sized metal components with complicated special-shape structure and high-performance requirement.

To solve the above problem, the present invention adopts the following technical solution:

A lamination manufacturing method for large-sized metal components with complicated structures in the present invention is realized by the following steps:

step 1. obtaining a three-dimensional digital model of a large-sized metal component with complicated structure, selecting a direction on the model according to service characteristics and the structural features of the large-sized metal component with complicated structure, dividing the model into a plurality of slice layers in a direction perpendicular to the selected direction, and selecting the thickness of each slice layer according to the features of the large-sized metal component with complicated structure and the thickness of an actually available metal sheet, at a level of millimeter;

step 2. selecting the actually available metal sheet corresponding to the thickness of each slice layer divided in step 1, and machining each metal sheet to obtain a shaped sheet consistent with the model of each slice layer in step 1;

step 3. stacking the shaped sheets obtained through machining of step 2 according to the order of the corresponding slice layers in step 1, placing a connecting agent between two adjacent shaped sheets, constraining positions of all the shaped sheets using a positioning constraint clamp, applying certain pressure in a direction perpendicular to the surfaces of the shaped sheets and connecting all the shaped sheets together using the connecting agents; and step 4. opening the positioning constraint clamp after all the shaped sheets are connected into a whole to obtain a required large-sized metal component with complicated structure.

The present invention has the beneficial effects that: 1. in the present invention, the three-dimensional digital model is built for the large-sized metal component with complicated structure and is divided into slice layers; precision machining of sheet laminating is conducted on the practical large-sized metal component with complicated structure according to the constructed three-dimensional digital model and a laminating principle; then, sheets are connected into a whole; each layer of sheet can be machined efficiently and accurately through the existing mechanical processing device; through the solution of "breaking up the whole into parts", the complicated structures of deep cavities and inner holes are shaped, so as to solve the shaping problem of the large-sized metal component with complicated special-shape structure and high-performance requirement.

2. In the present invention, laminating precision machining is conducted on the large-sized metal component with complicated structure; then, all layers are connected into a whole; each layer is a metal shaped sheet with the same or different thicknesses (millimeter-level or thicker), so that decomposition layers of the component are greatly reduced and the complicated component with large thickness or height is shaped efficiently; shaped sheets with different thicknesses can adapt to local features of the shaped component, so that machining process of the local features is simple and also ensures the shaping efficiency.

3. In the present invention, laminating precision machining is conducted on the large-sized metal component with complicated structure; then, all layers are connected into a whole; the inner cavity edge and the peripheral edge of each layer of shaped sheet can be quickly machined into bevels or curved surfaces completely consistent with the models of the slice layers through mechanical processing devices such as miller; after adjacent layers are stacked, discontinuous steps will not be generated on the inner cavity edge and the peripheral edge, so parts have smooth surfaces without needing machining of inner surfaces and outer surfaces after connection.

4. In the present invention, laminating precision machining is conducted on the large-sized metal component with complicated structure; then, all layers are connected into a whole; the adopted metal sheet may be standard metal sheet with a width of 2000-4000 mm and longer lengthwise direction; the adopted mechanical processing device is a miller with larger table top and simple function; and each layer is connected once without needing a special device, so the cost is very low compared with the traditional entire machining, entire plastic forming and the existing additive manufacturing method.

5. In the present invention, laminating precision machining is conducted on the large-sized metal component with complicated structure; then, all layers are connected into a whole; the mechanical performance of the adopted metal sheet is obviously better than that of the traditional cast or even forged stock, and is more stable, uniform and reliable than that of 3D printed material; in the shaping process, a workpiece structure is always an original structure of the sheet, so the shaped workpiece has excellent mechanical performance.

6. In the present invention, laminating precision machining is conducted on the large-sized metal component with complicated structure; then, all layers are connected into a whole; when the used metal sheet is anisotropic sheet, the mechanical performance of a manufactured part in a direction can be adjusted through the placing direction of the shaped sheet or the whole mechanical performance of the part is adjusted.

7. In the present invention, laminating precision machining is conducted on the large-sized metal component with complicated structure; then, all layers are connected into a whole; the metal sheets of different materials can be used for lamination manufacture, which provides a possibility for manufacturing the metal component with functional gradient requirements.

BRIEF DESCRIPTION OF THE DRAWINGS

FIG. 2 is a schematic diagram of shaping a large-sized metal component with complicated structure by a sheet lamination manufacturing method in the present invention.

FIG. 3 is a schematic diagram of machining corresponding sheets by divided slice layer models in the present invention.

Figure 1:
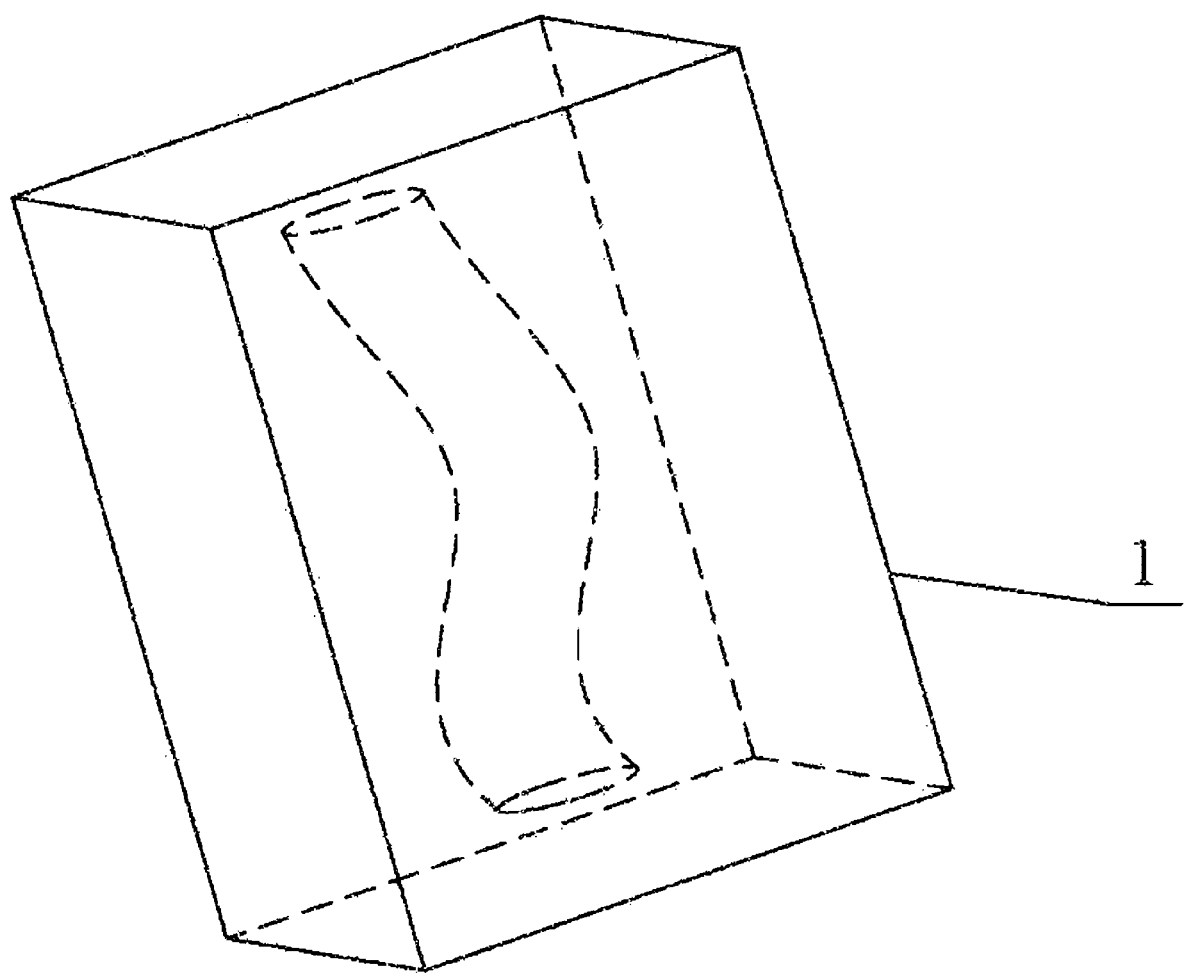
FIG. 1 is an axonometric drawing of a three-dimensional digital model of a large-sized complicated metal component for showing a shaping principle in the present invention.

Wherein 1 large-sized metal component with complicated structure; 2 actually available metal sheet; 2-1 shaped sheet; 4 positioning constraint clamp; and 5 slice layer divided from a model.

DETAILED DESCRIPTION

With reference to FIG. 1 to FIG. 8, a lamination manufacturing method for large-sized metal components with complicated structures is realized by the following steps:

step 1. obtaining a three-dimensional digital model of a large-sized metal component 1 with complicated structure, selecting a direction on the model according to service characteristics and the structural features of the large-sized metal component 1 with complicated structure; dividing the model into a plurality of slice layers 5 in a direction perpendicular to the selected direction, and selecting the thickness of each slice layer 5 according to the features of the large-sized metal component 1 with complicated structure and the thickness of an actually available metal sheet 2, at a level of millimeter;

step 2. selecting the actually available metal sheet 2 corresponding to the thickness of each slice layer 5 divided in step 1, and machining each metal sheet 2 to obtain a shaped sheet 2-1 consistent with the model of each slice layer 5 in step 1;

step 3. stacking the shaped sheets 2-1 obtained through machining of step 2 according to the order of the corresponding slice layers 5 in step 1, placing a connecting agent between two adjacent shaped sheets 2-1, constraining positions of all the shaped sheets 2-1 using a positioning constraint clamp 4, applying certain pressure in a direction perpendicular to the surfaces of the shaped sheets 2-1 and connecting all the shaped sheets 2-1 together using the connecting agents; and step 4. opening the positioning constraint clamp 4 after all the shaped sheets 2-1 are connected into a whole to obtain a required large-sized metal component 1 with complicated structure.

In the present embodiment, after the large-sized metal component 1 with complicated structure of the three-dimensional digital model is laminated, the metal sheets 2 are machined into sheets 2-1 consistent with the corresponding divided sheet layers in shapes; then the machined sheets 2-1 are connected through a certain connection manner so that a plurality of sheets 2-1 are connected into an entire element 1. The mode of "breaking up the whole into parts" greatly simplifies the shaping difficulty of the large-sized component with complicated structure and solves the shaping problem of the large-sized metal component with complicated special-shape structure and high-performance requirement.

The shaped sheet 2-1 adopted in each layer has larger thickness (millimeter-level or thicker), so that decomposition layers of the large-sized metal component 1 with complicated structure are greatly reduced and the complicated component with large thickness or height is shaped efficiently.

The inner cavity edge and the peripheral edge of each shaped sheet 2-1 can be quickly machined into bevels or curved surfaces completely consistent with the sheet model through mechanical processing devices such as miller; after adjacent layers are stacked, discontinuous steps will not be generated on the inner cavity edge and the peripheral edge, so parts have smooth surfaces without needing secondary machining of inner surfaces and outer surfaces after connection. The metal sheet 2 is processed in accordance with the model of each slice layer 5 in step 2.

Figure 4:
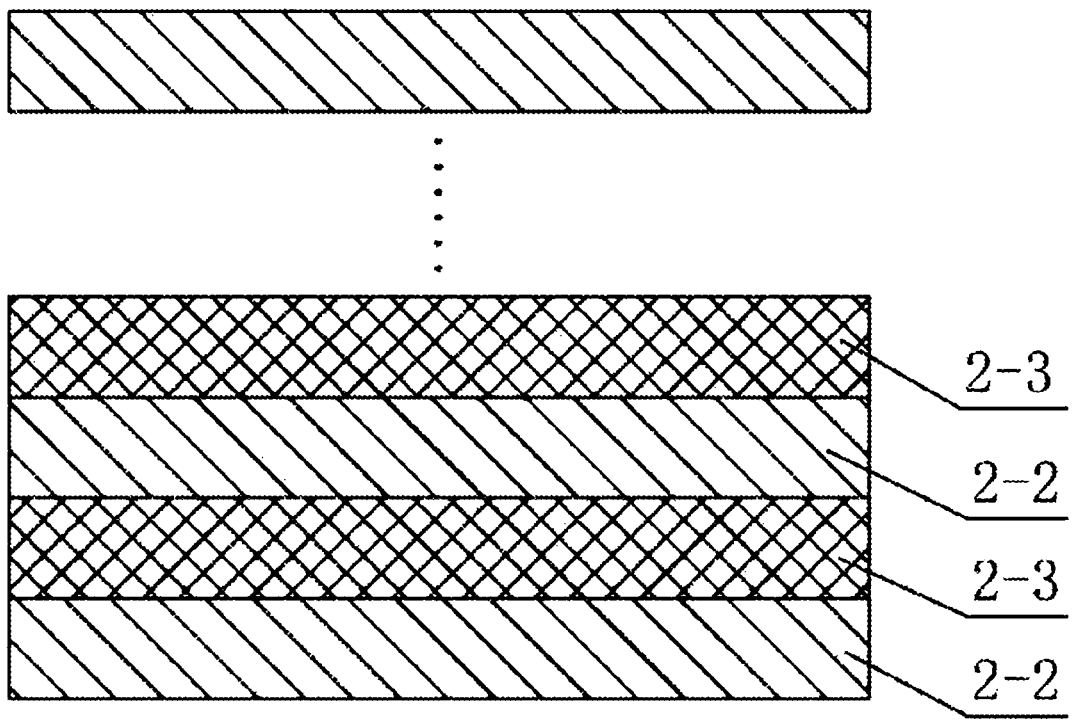
FIG. 4 is a schematic diagram for lamination manufacturing by arranging two sheets of different materials in a spacing manner.

With reference to FIG. 1 and FIG. 4, the actually available metal sheets 2 in step 2 are made of two materials, and in step 3, the shaped sheets 2-1 of two different materials stacked according to the order of the corresponding slice layers 5 in step 1 are arranged in a spacing. By means of this arrangement, the adopted sheets 2 are made of two different materials. The sheets (No. 1 sheet 2-2 and No. 2 sheet 2-3) of two different materials are mutually stacked, and the shaped component 1 has many attributes so as to satisfy many requirements for use performance. In addition, when the sheets 2-1 of a certain material are difficult to connect, the sheets (No. 1 sheet 2-2 and No. 2 sheet 2-3) of different materials can be adopted and placed in a spacing to enhance the connection strength between the shaped sheets 2-1.

Figure 5:
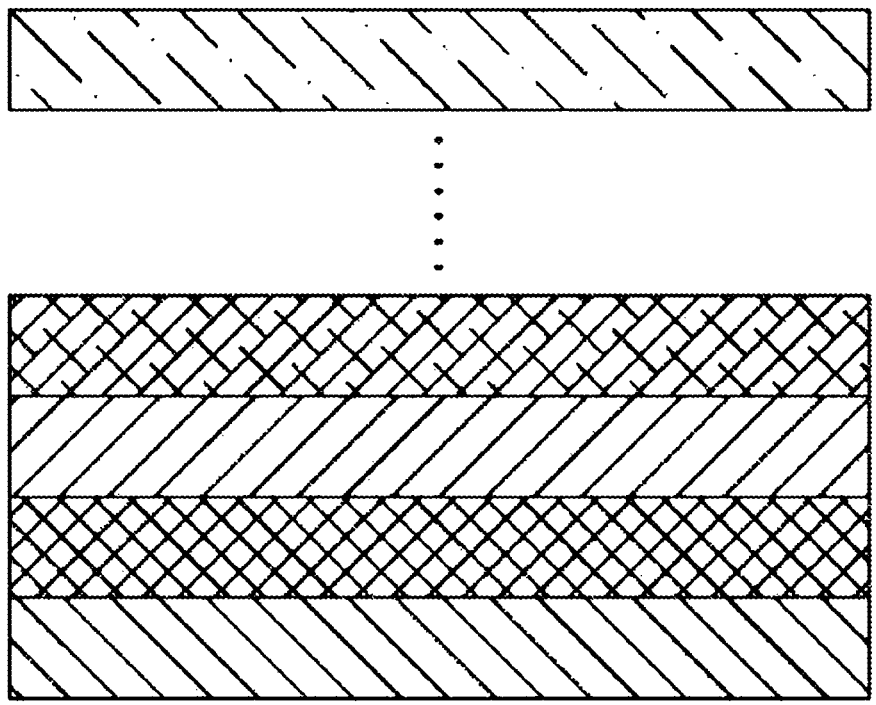
FIG. 5 is a schematic diagram for lamination manufacturing in which the materials of actually available metal sheets corresponding to the thickness of each slice layer are different in the present invention.

With reference to FIG. 2 and FIG. 5, the actually available metal sheets 2 corresponding to the thickness of each slice layer 5 in step 2 are made of different materials. By means of this arrangement, the adopted sheets 2 can be made of different materials. The sheets of different materials are stacked in order. The shaped large-sized component 1 with complicated structure has many attributes so as to satisfy many requirements for use performance.

Figure 6:
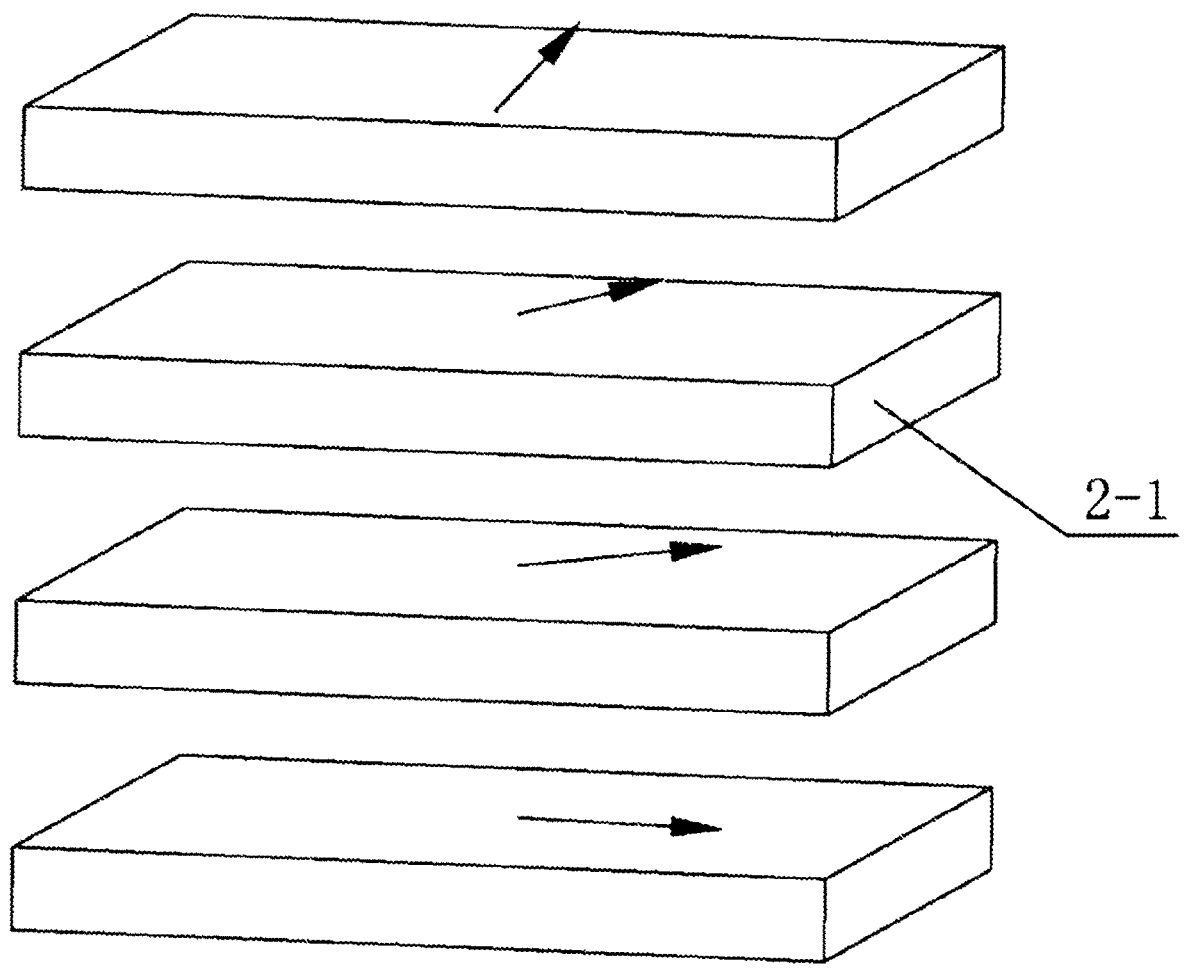
FIG. 6 is a schematic diagram of different placing directions of anisotropic sheets in the present invention.

With reference to FIG. 2 and FIG. 6, the actually available metal sheets 2 in step 2 are anisotropic sheets; when the shaped sheets 2-1 are stacked in step 3, the anisotropic shaped sheets 2-1 are placed along different opposite directions. The arrow in FIG. 6 indicates the anisotropic direction of the shaped sheets. The selected metal sheet 2 is the anisotropic sheet. When the shaped sheets 2-1 are stacked, the anisotropic directions of the sheets are placed along different directions to offset the influence caused by different properties in the directions of the shaped sheets 2-1. The whole mechanical performance of the component is adjusted so that the properties in all directions of the large-sized component 1 with complicated structure are uniform. In addition, the direction with better performance of the shaped sheet 2-1 can be placed along a certain direction as required, so that the performance of the shaped large-sized component 1 with complicated structure along a certain direction can be enhanced.

Figure 7:
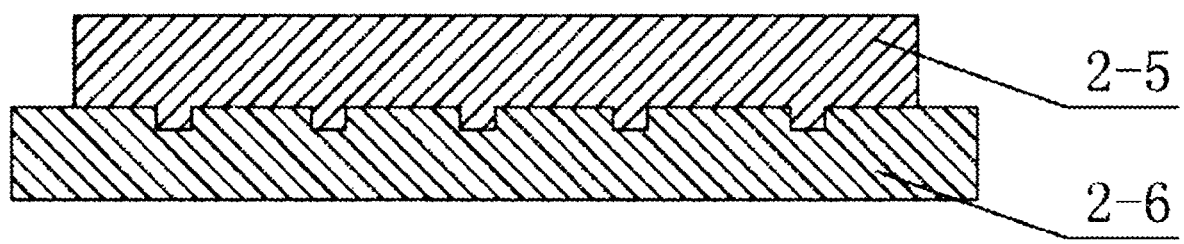
FIG. 7 is a schematic diagram of connection realized by adopting a bumpy ridge joining structure between sheet fitting surfaces of the present invention.

With reference to FIG. 2 and FIG. 7, the shaped sheets 2-1 in step 2 are sheets with fitting surfaces of bumpy ridge joining structures. By means of this arrangement, shear strength between layers of the shaped sheets 2-1 can be increased, so as to increase the shear strength between surface layers of the large-sized component 1 with complicated structure. The bumpy ridge joining structures of the fitting surfaces involve multimodal structures, including sawtooth forms such as rectangle, triangle, etc.

Figure 8:
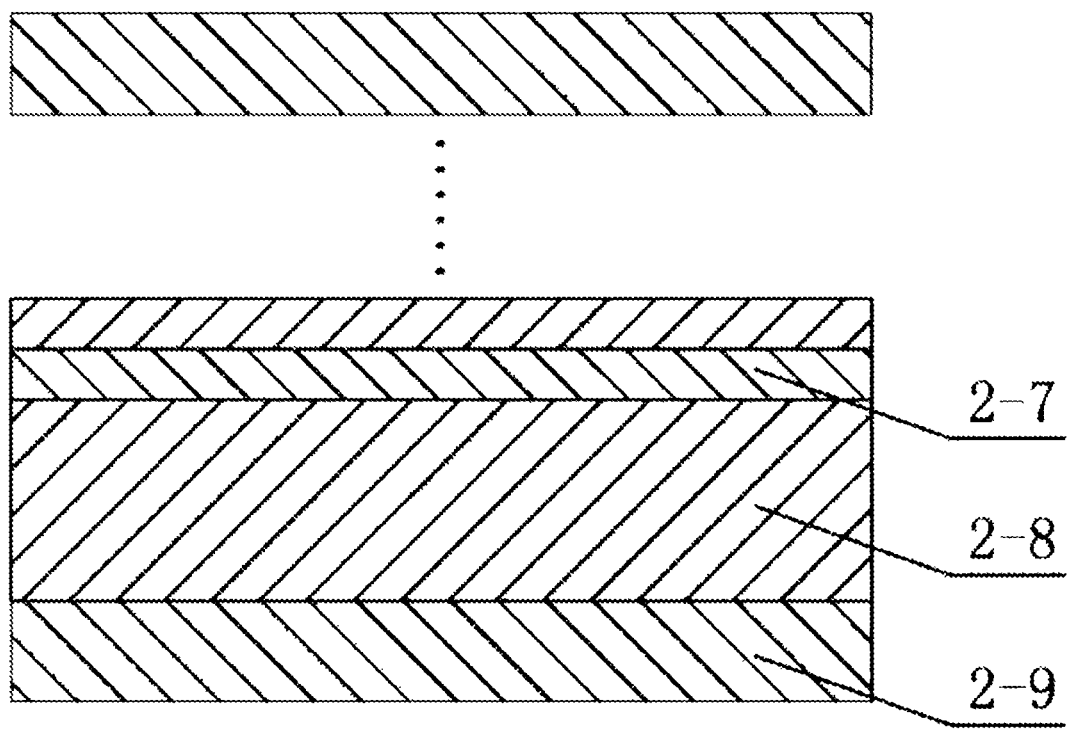
FIG. 8 is a schematic diagram for lamination manufacturing by adopting shaped sheets with different thicknesses in the present invention.

With reference to FIG. 1 and FIG. 8, when the model of the large-sized complicated component 1 is layered in step 1, the thickness of each slice layer 5 may be different. When the three-dimensional digital model of the large-sized complicated component 1 is layered in step 1, the thickness of each slice layer may be selected according to the local features of the large-sized component 1 with complicated structure. For the position with small feature, the layering thickness shall be reduced. For the position with unconspicuous feature, layer with large thickness can be selected. The shaped sheets 2-1 in the corresponding step 2 shall select sheets with different thicknesses (thickness 1: sheet 2-7; thickness 2: sheet 2-8 and thickness 3: sheet 2-9). By means of this arrangement, the shaped sheets 2-1 with different thicknesses are selected to adapt to local features of the shaped large-sized component 1 with complicated structure, so that machining process of the local features is simple and also ensures the shaping efficiency.

With reference to FIG. 2, FIG. 4, FIG. 5, FIG. 7 and FIG. 8, the manner of connecting the two adjacent shaped sheets 2-1 using the connecting agent in step 3 is brazing connection or diffusion connection. By means of this arrangement, connection is stable and reliable and operation is simple and easy.

We claim:

1. A lamination manufacturing method for large-sized metal components with complicated structures, the method being realized by the following steps:
   step 1. obtaining a three-dimensional digital model of a large-sized metal component with complicated structure, selecting a direction on the model according to service characteristics and the structural features of the large-sized metal component with complicated structure; dividing the model into a plurality of slice layers in a direction perpendicular to the selected direction, and selecting the thickness of each slice layer according to the features of the large-sized metal component with complicated structure and the thickness of an actually available metal sheet, at a level of millimeter;
   step 2. selecting the actually available metal sheet corresponding to the thickness of each slice layer divided in step 1, and machining each metal sheet to obtain a shaped sheet consistent with the model of each slice layer in step 1;
   step 3. stacking the shaped sheets obtained through machining of step 2 according to the order of the corresponding slice layers in step 1, placing a connecting agent between two adjacent shaped sheets, constraining positions of all the shaped sheets using a positioning constraint clamp, applying certain pressure in a direction perpendicular to the surfaces of the shaped sheets and connecting all the shaped sheets together using the connecting agents; and
   step 4. opening the positioning constraint clamp after all the shaped sheets are connected into a whole to obtain a required large-sized metal component with complicated structure;
   wherein the actually available metal sheets in step 2 are anisotropic sheets; when the shaped sheets are stacked in step 3, the anisotropic shaped sheets are placed along different directions of anisotropy.

2. The lamination manufacturing method for large-sized metal components with complicated structures according to claim 1, wherein the actually available metal sheets in step 2 are made of two materials, and in step 3, the shaped sheets of two different materials stacked according to the order of the corresponding slice layers in step 1 are arranged in a spacing.

3. The lamination manufacturing method for large-sized metal components with complicated structures according to claim 1, wherein the actually available metal sheets corresponding to the thickness of each slice layer in step 2 are made of different materials.

4. The lamination manufacturing method for large-sized metal components with complicated structures according to claim 1, wherein the shaped sheets in step 2 are sheets with fitting surfaces of bumpy ridge joining structures.

5. The lamination manufacturing method for large-sized metal components with complicated structures according to claim 4, wherein the manner of connecting the two adjacent shaped sheets using the connecting agent in step 3 is brazing connection or diffusion connection.

* * * * *